(12) United States Patent
Chen

(10) Patent No.: US 10,962,775 B2
(45) Date of Patent: Mar. 30, 2021

(54) OPTICAL LENS BARREL HAVING TRANSMISSIVE LIQUID CRYSTAL DISPLAY FUNCTION, LIQUID CRYSTAL DISPLAY MODULE AND DISPLAY SCREEN

(71) Applicant: Guoping Chen, Shenzhen (CN)

(72) Inventor: Guoping Chen, Shenzhen (CN)

( * ) Notice: Subject to any disclaimer, the term of this patent is extended or adjusted under 35 U.S.C. 154(b) by 0 days.

(21) Appl. No.: 16/813,602

(22) Filed: Mar. 9, 2020

(65) Prior Publication Data

US 2020/0333595 A1    Oct. 22, 2020

(30) Foreign Application Priority Data

Apr. 21, 2019  (CN) .......................... 201910320950.5
Aug. 26, 2019  (CN) .......................... 201921393129.8
Nov. 25, 2019  (CN) .......................... 201922045595.3
Dec. 2, 2019   (CN) .......................... 201922115438.5

(51) Int. Cl.

| | |
|---|---|
| *G02B 27/01* | (2006.01) |
| *F21V 8/00* | (2006.01) |
| *G02B 23/00* | (2006.01) |
| *G02F 1/13357* | (2006.01) |
| *G02F 1/1334* | (2006.01) |
| *F41G 1/34* | (2006.01) |
| *F41G 1/38* | (2006.01) |
| *G02F 1/1335* | (2006.01) |

(52) U.S. Cl.
CPC ......... *G02B 27/0101* (2013.01); *F41G 1/345* (2013.01); *F41G 1/38* (2013.01); *G02B 6/0021* (2013.01); *G02B 6/0068* (2013.01); *G02B 6/0073* (2013.01); *G02B 23/00* (2013.01); *G02B 27/0189* (2013.01); *G02F 1/1334* (2013.01); *G02F 1/133615* (2013.01); *G02F 1/133621* (2013.01); *G02B 2027/0141* (2013.01); *G02F 1/13347* (2021.01); *G02F 1/133616* (2021.01); *G02F 2203/01* (2013.01); *G02F 2203/03* (2013.01)

(58) Field of Classification Search
None
See application file for complete search history.

(56) References Cited

U.S. PATENT DOCUMENTS

| 2018/0003964 A1* | 1/2018 | Tatsuno ................. B60K 35/00 |
| 2018/0224730 A1* | 8/2018 | Hirata .................... G02B 17/08 |

\* cited by examiner

*Primary Examiner* — Elmito Breval
(74) *Attorney, Agent, or Firm* — CBM Patent Consulting, LLC

(57) ABSTRACT

An optical lens barrel having a transmissive liquid crystal display function, liquid crystal display module and display screen, wherein the optical lens barrel comprises a lens barrel body, an eye lens disposed at one end of the lens barrel body, an objective lens disposed at the other end of the lens barrel body, and an LCD display screen disposed at a focal plane position of the optical lens barrel, wherein the LCD display screen is a light scattering LCD display screen; the optical lens barrel is further internally provided with a visible light source; the position of the light source should satisfy: the light source is disposed outside a visible area of the light scattering LCD display screen.

20 Claims, 19 Drawing Sheets

OPTICAL LENS BARREL HAVING TRANSMISSIVE LIQUID CRYSTAL DISPLAY FUNCTION, LIQUID CRYSTAL DISPLAY MODULE AND DISPLAY SCREEN

This application claims priority to Chinese Patent Application Ser. No. CN201910320950.5, CN201921393129.8, CN201922115438.5 and CN201922045595.3 filed on 21 Apr. 2019, 26 Aug. 2019, 2 Dec. 2019 and 25 Nov. 2019 in the People's Republic of China (CN), respectively.

TECHNICAL FIELD

The present invention relates to an optical lens barrel, in particular to an optical lens barrel having a transmissive liquid crystal display function, liquid crystal display module and display screen which can be used on a range finder, a sighting piece, a magnifier, a telescope, a microscope or a camera viewfinder to directly view an object outside an objective lens, and can also be used to is display a predetermined word and/or pattern in at least one color on a display screen without being influenced by environment light intensity.

BACKGROUND

An existing optical lens barrel comprises a lens barrel body, an eye lens disposed at one end of the lens barrel body, an objective lens disposed at the other end of the lens barrel body, and a transmissive LCD or LED display screen disposed at a focal plane position, wherein the LCD display screen allows a user to directly view an object outside the objective lens from the eye lens via the objective lens; furthermore, the LCD display screen can also display a preset word and/or a pattern under the control of an LCD driver.

At present, the LCD display screens used in the existing optical lens barrel manly comprise the following types: the first one is a TN display screen, and such a display screen has a low light transmittance rate and cannot be used in a dark environment; the second one is a highly-transmissive liquid crystal display screen, and such a display screen has a light transmission rate as high as 90%, but cannot be used in a dark environment just like the TN display screen; and the third one is an improved highly-transmissive liquid crystal display screen, and such a display screen is provided with a monochromatic LED lamp on a small side surface of the highly-transmissive liquid crystal display screen perpendicular to a display panel, such as a red, a green or a blue LED lamp; when the light is dark, the monochromatic LED lamp can be turned on to display on the display screen the word and/or the pattern in the same color as the LED lamp but in a different light intensity; however, the background color of the improved highly-transmissive liquid crystal display screen is the same as the color of the LED lamp; on one hand, the color difference between the word and/or the pattern and the background color becomes small, thus influencing the reading of the user; on the other hand, the chromatic background color reduces the light transmission rate of the display screen. Apart from the LCD screens, another actively-light-emitting display screen is also used, such as LED and OLED. The OLED display screen is a self-light-emitting display screen, and thus better solves the problem that the existing display screen cannot be used in a dark environment. However, the OLED display screen itself is a light emitter; if external environment light is very strong, the luminance of the OLED display screen would be counteracted by the luminance of the external environment, in which case the word and/or the pattern would not be easy to see clearly. Furthermore, the light transmittance rate of the display screen is much less than the level of the highly-transmissive LCD. In addition, since the OLED display screen is expensive, the optical lens barrel with the OLED display screen is also very expensive, and can only be used on a high end market. An optical lens barrel having a high light transmittance rate, a colorless or almost colorless LCD display screen background, being free from the influence of external environment light intensity, and being cost effective is in urgent need on market.

SUMMARY

In order to overcome the problems above, the present invention provides an optical lens barrel having a transmissive liquid crystal display function, liquid crystal display module and display screen which have a high light transmittance rate, a colorless or almost colorless LCD display screen background, and is free from the influence of external environment light intensity.

The technical solution of the present invention is: an optical lens barrel having a transmissive liquid crystal display function is provided; the optical lens barrel comprises a lens barrel body, an eye lens disposed at one end of the lens barrel body, an objective lens disposed at the other end of the lens barrel body, and an LCD display screen disposed at a focal plane position of the optical lens barrel, wherein a visible area of the LCD display screen allows a user to directly view an object outside the lens barrel from the eye lens via the objective lens; furthermore, the LCD display screen displays a word and/or a pattern under the control of an LCD driver; the LCD display screen is a light scattering LCD display screen; the optical lens barrel is further internally provided with a light source; the position of the light source should satisfy: the light source is disposed outside the visible area of the light scattering LCD display screen, the light source is disposed in front and/or back of the light scattering LCD display screen, a maximum incident angle of light of the light source is selected from a range greater than or equal to 30 degrees and less than 90 degrees, and incident light or reflected light of the light source should avoid directly irradiating a visible area of the eye lens.

As an improvement to the present invention, the light source is a monochromatic light source in red, green or blue color, or is a mixed color light source consisting of any two or three of red, green and blue colors.

As an improvement to the present invention, the light source is an LED light source.

As an improvement to the present invention, the light source is at least one point light source; each point light source is independently disposed on an inner wall between the light scattering LCD display screen and the objective lens; and light emitted by the point light sources slantwise irradiates the visible area of the light scattering LCD display screen.

As an improvement to the present invention, the light source is at least one point light source; each point light source is independently disposed on an inner wall between the light scattering LCD display screen and the eye lens; and light emitted by the point light sources slantwise irradiates the visible area of the light scattering LCD display screen.

As an improvement to the present invention, the light source is a plurality of point light sources; the point light sources are disposed on an inner surface of an annular face plate; the annular face plate is disposed on an inner wall between the light scattering LCD display screen and the objective lens; and light emitted by the point light sources slantwise irradiates the visible area of the light scattering LCD display screen.

As an improvement to the present invention, the light source is a plurality of point light sources; the point light sources are disposed on an inner surface of an annular face plate; the annular face plate is disposed on an inner wall between the light scattering LCD display screen and the eye lens; and light emitted by the point light sources slantwise irradiates the visible area of the light scattering LCD display screen.

As an improvement to the present invention, the light source is a plane light source; the plane light source comprises a light diffusion plate; the light diffusion plate is provided with a through hole which is larger than or equal to the area of the visible area; at least one point light source is disposed on a side surface of the light diffusion plate; a ring of effective light emitting area is disposed around the through hole; and light emitted by the effective light emitting area slantwise irradiates the visible area of the light scattering LCD display screen.

As an improvement to the present invention, the plane light source is disposed on an inner wall between the light scattering LCD display screen and the objective lens, or is disposed on inner wall between the light scattering LCD display screen and the eye lens, or is directly attached on an outer surface of the light scattering LCD display screen.

The present invention further provides a liquid crystal display module for an optical lens barrel, comprising a light scattering LCD display screen, a light source, a light guide plate, and a fixing base provided with a first through hole, wherein the light scattering LCD display screen and a first light shielding member are sequentially disposed on one side of the fixing base; the first light shielding member is provided with a second through hole; the light guide plate provided with a third through hole, the light source provided with a fourth through hole, and a second light shielding member provided with a fifth through hole are sequentially disposed on the other side of the fixing base; the first through hole, the second through hole, the third through hole, the fourth through hole, and the fifth through hole are at least partially overlapped, allowing light to pass through.

The present invention further provides a light scattering LCD display with an optical reticle, comprising a first glass sheet and a second glass sheet, wherein a liquid crystal display layer is disposed between the first glass sheet and the second glass sheet; the liquid crystal display layer is used to display data information; the first glass sheet or the second glass sheet is provided with a cross scale on one side adjacent to the light scattering liquid crystal display layer, or on one side away from the light scattering liquid crystal display layer; when light passes through the cross scale, the light passing through the cross scale is basically absorbed, forming a color close to black.

The present invention reasonably configures the position of the light source in the lens barrel body, such that incident light of the light source slantwise radiates the visible area of the light scattering LCD display screen, and the word and/or the pattern in the LCD display area would generate light scattering, and present a color the same as the color lamp; the light transmittance rate of the light scattering LCD display screen is as high as 90%; therefore, the incident light basically passes through the background part beyond the word and/or the pattern in the light scattering LCD display area, slantwise radiates a barrel wall, and is absorbed by the black barrel wall. Hence, the background of the visible area of the light scattering LCD display screen is basically transparent. When the light source is disposed between the light scattering LCD display screen and the eye lens, even if a part of chromatic light is reflected in the eye lens direction, the reflected light would not be reflected into the eye lens owing to the correct configuration of a reflection angle. Therefore, for the user, the background of the visible area thereof is still basically transparent. In a super-bright environment, the light source can be turned off, such that the word and/or the pattern can be displayed in black color on the light scattering display screen, so as to obtain a good contrast ratio. Compared with the optical lens barrel with a TN display screen, the present invention has a high light transmittance rate, and can still be used in a dark environment. Compared with the optical lens barrel with a highly-transmissive liquid crystal display screen, the present invention can still be used in a dark environment. Compared with the optical lens barrel with an improved highly-transmissive liquid crystal display screen, the present invention not only can still be used in a dark environment, but also has a transparent background color, and can clearly display the word and/or the pattern. Compared with the optical lens barrel with an LED or OLED display screen, the present invention is cheap, has a high light transmittance rate, and can be switched to black when the external environment is super-bright. Therefore, the present invention can overcome the defects in the prior art, and obtain a cost effective optical lens barrel having a transmissive display function.

In addition, in the present invention, the light scattering LCD display screen, the light source and the light guide plate are respectively disposed on the two sides of the fixing base provided with the first through hole, so as to form a display module, thus facilitating installation and maintenance.

In the light scattering LCD display provided with an optical reticle in the present invention, the first glass sheet or the second glass sheet is provided with a cross scale on one side adjacent to the light scattering liquid crystal display layer, or on one side away from the light scattering liquid crystal display layer; and when light passes through the cross scale, the light passing through the cross scale is basically absorbed, forming a structure in a color close to black. Therefore, when the display with an optical reticle is disposed in the optical lens barrel, the data information can be displayed on the liquid crystal layer in a color different from the black color of the cross scale, thus improving user experience basically without increasing the cost of the liquid crystal display.

DETAILED DESCRIPTION

Figure 1:
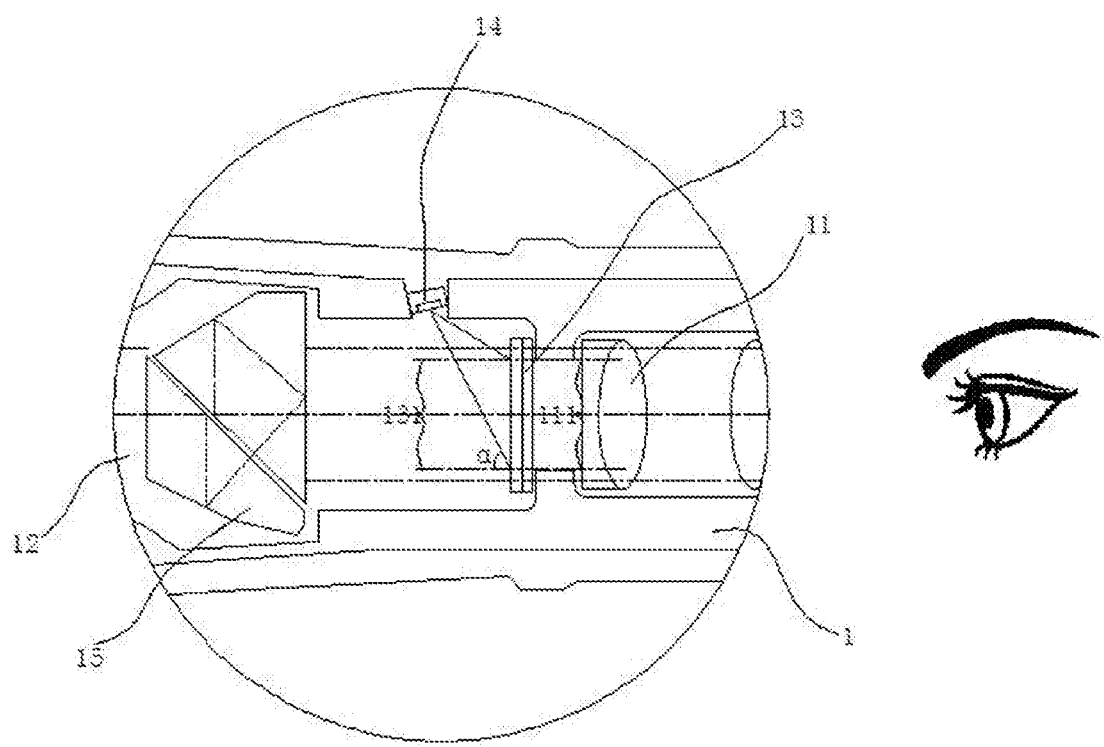
FIG. 1 is a planar structure diagram of a first embodiment of the present invention.

In the descriptions of the present invention, it should be understood that the azimuth or position relationships indicated by the terms "center", "up", "down" "front", "back" "left", "right" and the like are the azimuth or position relationships as shown in the drawings, and are only intended to facilitate the description of the present invention and simplify the description, but not to indicate or imply that the designated devices or assemblies must have a specific azimuth or are constructed and operated in a specific azimuth. Therefore, the terms cannot be considered to limit the present invention. In addition, the terms "first" and "second" are used for the purpose of description only, but cannot be considered to indicate or imply relative importance.

In the descriptions of the present invention, it should be noted that unless otherwise specified and stated, the terms "install", "connect", and "connection" should be understood in a broad sense, for example, the term "connection" can be a fixed connection, a detachable connection, or an integral connection, can be a mechanical connection, or an electrical connection, and can be a direct connection, an indirect connection via an intermediate medium, or an internal communication between two assemblies. A person skilled in the art can understand the specific meanings of the above terms in the present invention according to specific circumstances.

The transmissive liquid crystal display in the present invention means that the liquid crystal display not only can display a word and/or a pattern, but also can view an opposite object image through the liquid crystal display screen.

The maximum incident angle in the present invention refers to the maximum incident angle of the entire incident light of the light source 14 in the visible area of the liquid crystal display screen.

With reference to FIG. 1, FIG. 1 shows an optical lens barrel having a transmissive liquid crystal display function. The optical lens barrel comprises a lens barrel body 1, an eye lens 11 disposed at one end of the lens barrel body 1, an objective lens 12 disposed at the other end of the lens barrel body 1, and an LCD display screen disposed at a focal plane position of the optical lens barrel, wherein a visible area 131 of the LCD display screen allows a user to directly view an object outside the lens barrel 1 from the eye lens 11 via the objective lens 12; furthermore, the LCD display screen 13 displays a word and/or a pattern (not shown in the figure) under the control of an LCD driver; the LCD display screen is a light scattering LCD display screen 13; the optical lens barrel is further internally provided with a light source 14; the position of the light source 14 should satisfy: the light source is disposed outside the visible area 131 of the light scattering LCD display screen, the light source is disposed in back of the light scattering LCD display screen, a maximum incident angle $\alpha$ of light of the light source 14 is selected from a range greater than or equal to 30 degrees and less than 90 degrees, and incident light or reflected light of the light source 14 should avoid directly irradiating a visible area 111 of the eye lens. The front side in the present invention refers to a position between the light scattering LCD display screen and the eye lens 11; and the back side in the present invention refers to a position between the light scattering LCD display screen and the objective lens 12. In order to present an upstanding object image on the eye lens 11, a prism 15 is also disposed between the light scattering LCD display screen and the objective lens 12.

In the present embodiment, the light scattering LCD display screen can adopt the light scattering reversed PDLCD (reversed polymer dispersed liquid crystal display) produced by Shenzhen Santech Display Co., Ltd.

In the present embodiment, the light source 14 is a point light source; the point light source is disposed on an inner surface of the lens barrel body 1, or is embedded on the inner surface of the lens barrel body 1.

The present embodiment finds that the requirement of the present invention can be achieved when the maximum incident angle $\alpha$ of light of the light source 14 is greater than or equal to 30 degrees and less than 90 degrees; and the greater the maximum incident angle is, namely the closer the light source is located to the display screen, the less visible stray light in the eye lens would become, the more space the lens barrel would save, and the more convenient the installation in practical would be. A better maximum incident angle range is greater than or equal to 45 degrees and less than 90 degrees; and the best range is greater than or equal to 60 degrees and less than 90 degrees.

Compared with the optical lens barrel with a TN display screen, the present invention has a high light transmittance rate, and can still be used in a dark environment. Compared with the optical lens barrel with a highly-transmissive liquid crystal display screen, the present invention can still be used in a dark environment. Compared with the optical lens barrel with an improved highly-transmissive liquid crystal display screen, the present invention not only can still be used in a dark environment, but also has a transparent background color, and can clearly display the word and/or the pattern. Compared with the optical lens barrel with an LED or OLED display screen, the present invention is cheap, has a high light transmittance rate, and is free from external environment light intensity.

Figure 2:
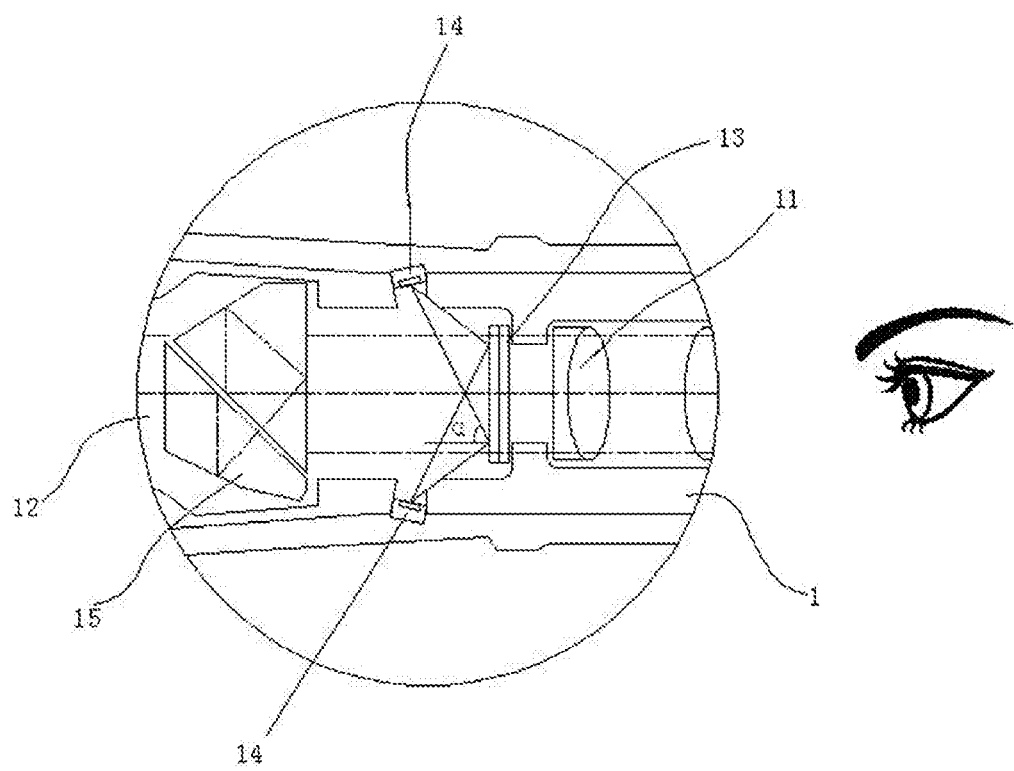
FIG. 2 is a planar structure diagram of a second embodiment of the present invention.

With reference to FIG. 2, FIG. 2 is a planar structure diagram of a second embodiment of the present invention.

Compared with the embodiment as shown in FIG. 1, the structure of the embodiment as shown in FIG. 2 is basically the same; the differences are: in FIG. 2, the point light sources are two, and are symmetrically disposed at symmetric positions on the inner surface of the lens barrel body 1; and emitted light thereof respectively slantwise irradiates the visible area 131 of the light scattering LCD display screen. It is apparent that the irradiation luminance of the two symmetric point light sources in the visible area is uniform, and therefore the effect is better than that of the first embodiment.

Figure 3:
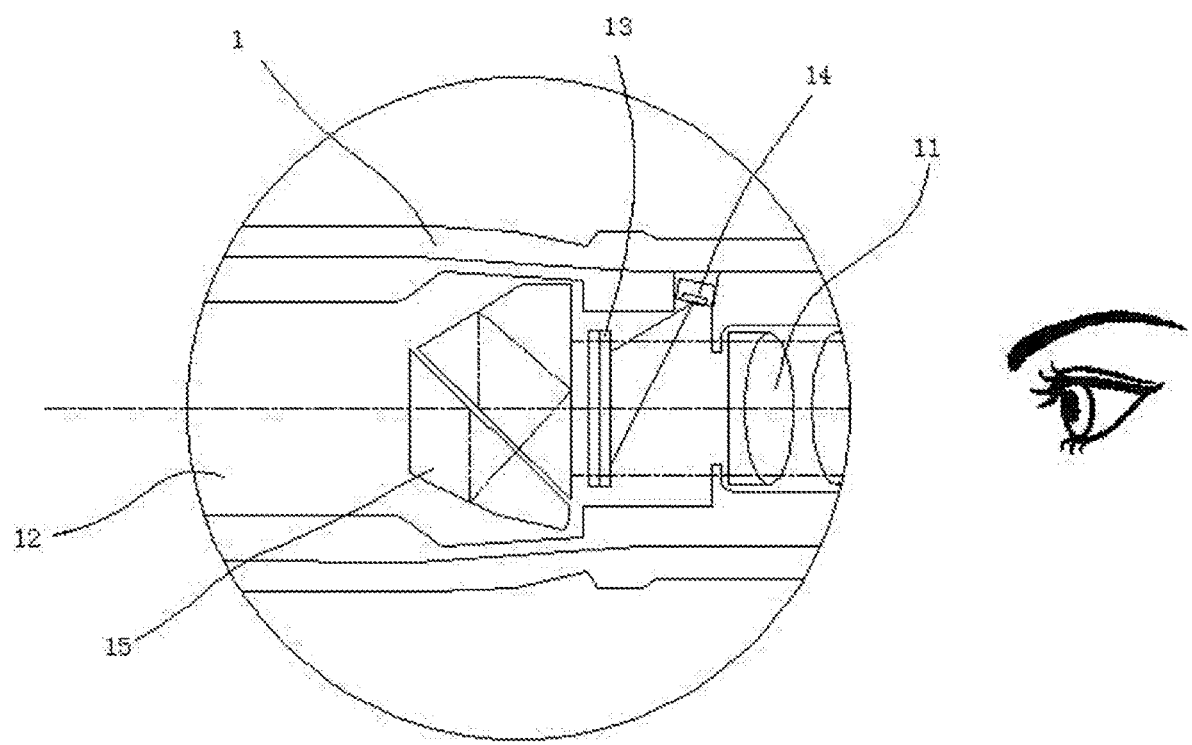
FIG. 3 is a planar structure diagram of a third embodiment of the present invention.

With reference to FIG. 3, FIG. 3 is a planar structure diagram of a third embodiment of the present invention.

Compared with the embodiment as shown in FIG. 1, the structure of the embodiment as shown in FIG. 3 is basically the same; the differences are: in FIG. 3, the point light sources are disposed in front of the light scattering LCD display screen, and emitted light thereof respectively slantwise irradiates the visible area 131 of the light scattering LCD display screen.

Figure 4:
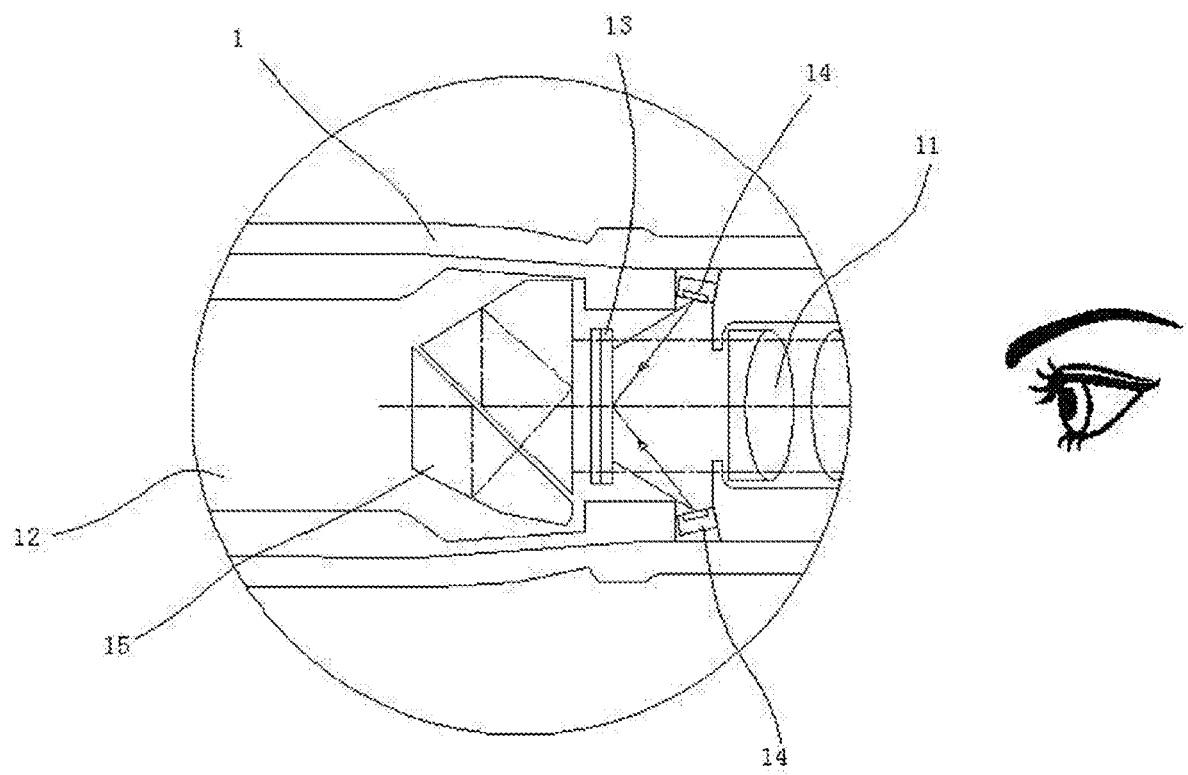
FIG. 4 is a planar structure diagram of a fourth embodiment of the present invention.

With reference to FIG. 4, FIG. 4 is a planar structure diagram of a fourth embodiment of the present invention.

Compared with the embodiment as shown in FIG. 3, the structure of the embodiment as shown in FIG. 4 is basically the same; the differences are: in FIG. 4, the point light sources are two, and are symmetrically disposed at symmetric positions on the inner surface of the lens barrel body 1; and emitted light thereof respectively slantwise irradiates the visible area 131 of the light scattering LCD display screen.

Figure 5:
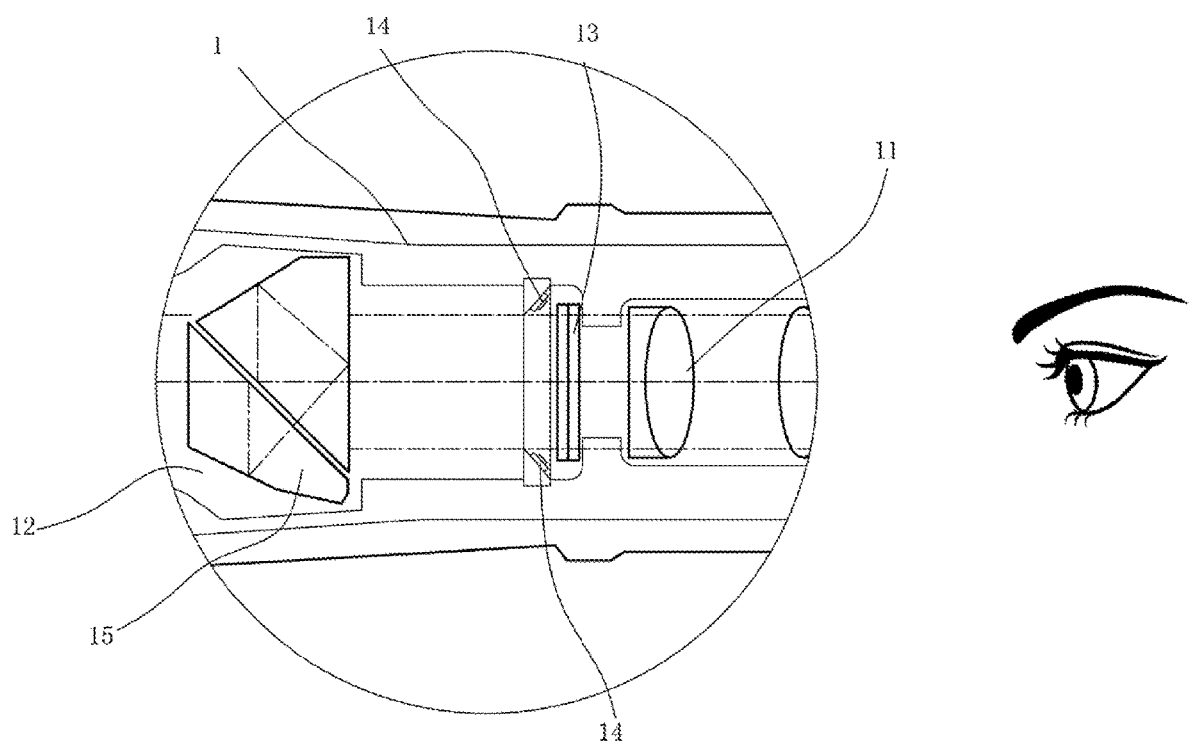
FIG. 5 is a planar structure diagram of a fifth embodiment of the present invention.

With reference to FIG. 5, FIG. 5 is a planar structure diagram of a fifth embodiment of the present invention.

Figure 7:
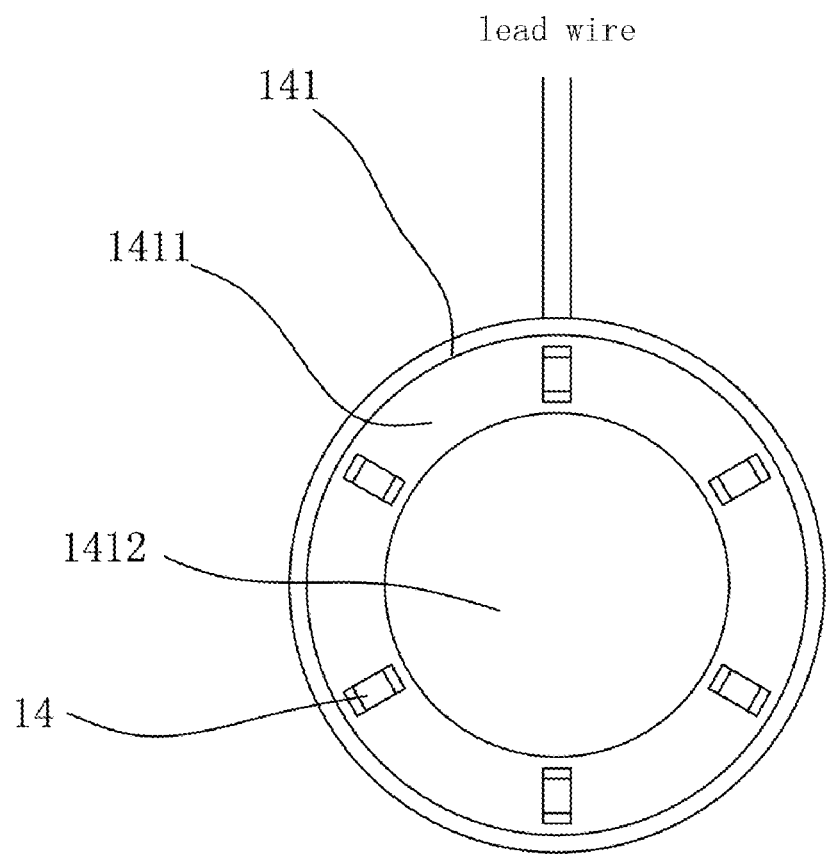
FIG. 7 is a structure diagram of a lamp panel in FIGS. 5 and 6.
Figure 8:
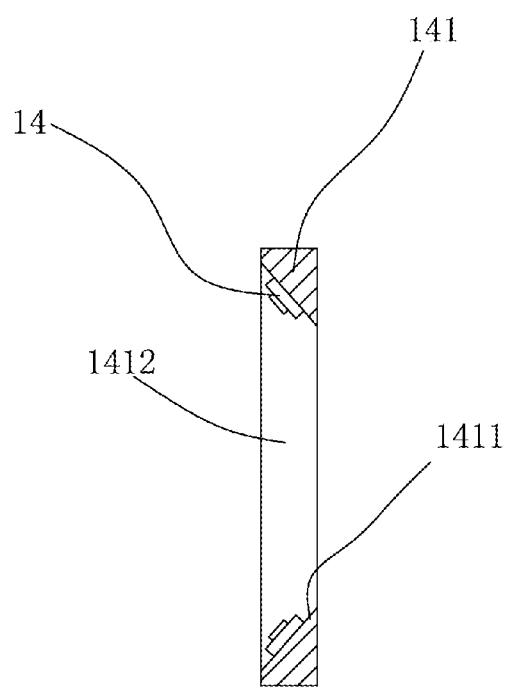
FIG. 8 is a sectional structure diagram of a side surface in FIG. 7.

In the present embodiment, the light source 14 is a plurality of point light sources (six, as shown in the figure; and more than one point light sources can also be configured according to requirements, as shown in FIGS. 7 and 8); the point light sources are disposed on an inner surface 1411 of an annular face plate 141; the area of an intermediate through hole 1412 of the annular face plate 141 is greater than or equal to the area of the visible area 131, so as to ensure that the light can reach the visible area 131; the annular face plate 141 is disposed on an inner wall between the light scattering LCD display screen and the objective lens 12; and the light emitted by the point light sources slantwise irradiates the visible area 131 of the light scattering LCD display screen.

Figure 6:
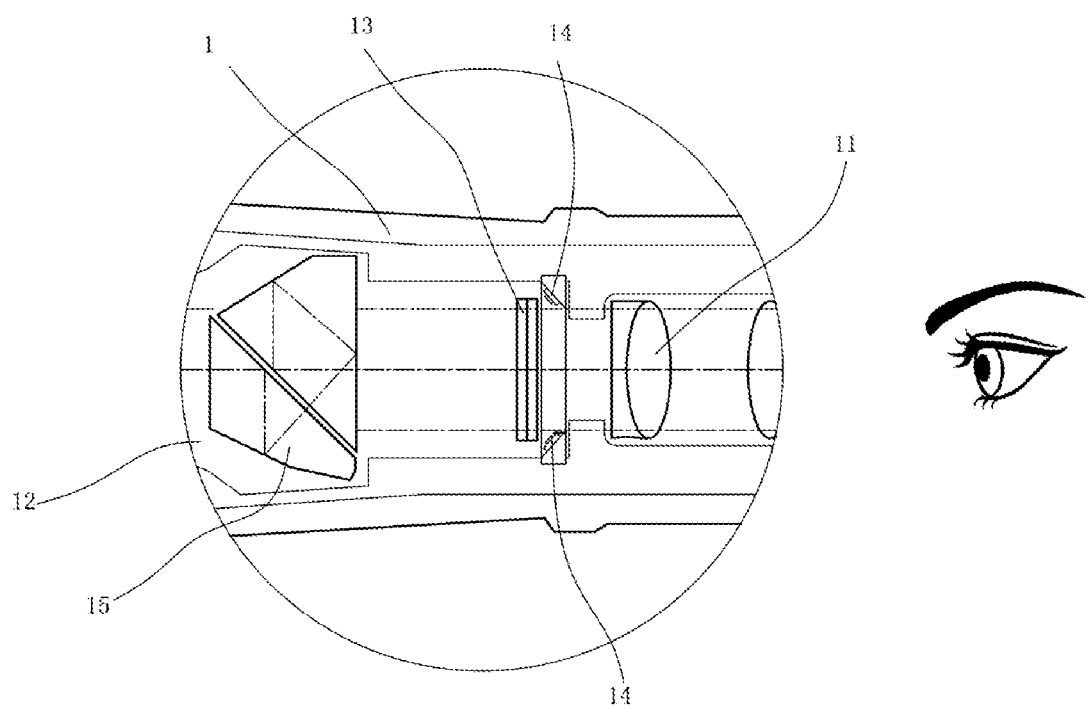
FIG. 6 is a planar structure diagram of a sixth embodiment of the present invention.

With reference to FIG. 6, FIG. 6 is a planar structure diagram of a sixth embodiment of the present invention.

In the embodiment as shown in FIG. 6, the light source 14 is a plurality of point light sources (six, as shown in the figure; and more than one point light sources can also be configured according to requirements, as shown in FIGS. 7 and 8); the point light sources are disposed on an inner surface 1411 of an annular face plate 141; the area of an intermediate through hole 1412 of the annular face plate 141 is greater than or equal to the area of the visible area 131, so as to ensure that the light can reach the visible area 131; the annular face plate 141 is disposed on an inner wall between the light scattering LCD display screen and the eye lens 11; and the light emitted by the point light sources slantwise irradiates the visible area 131 of the light scattering LCD display screen.

Figure 9:
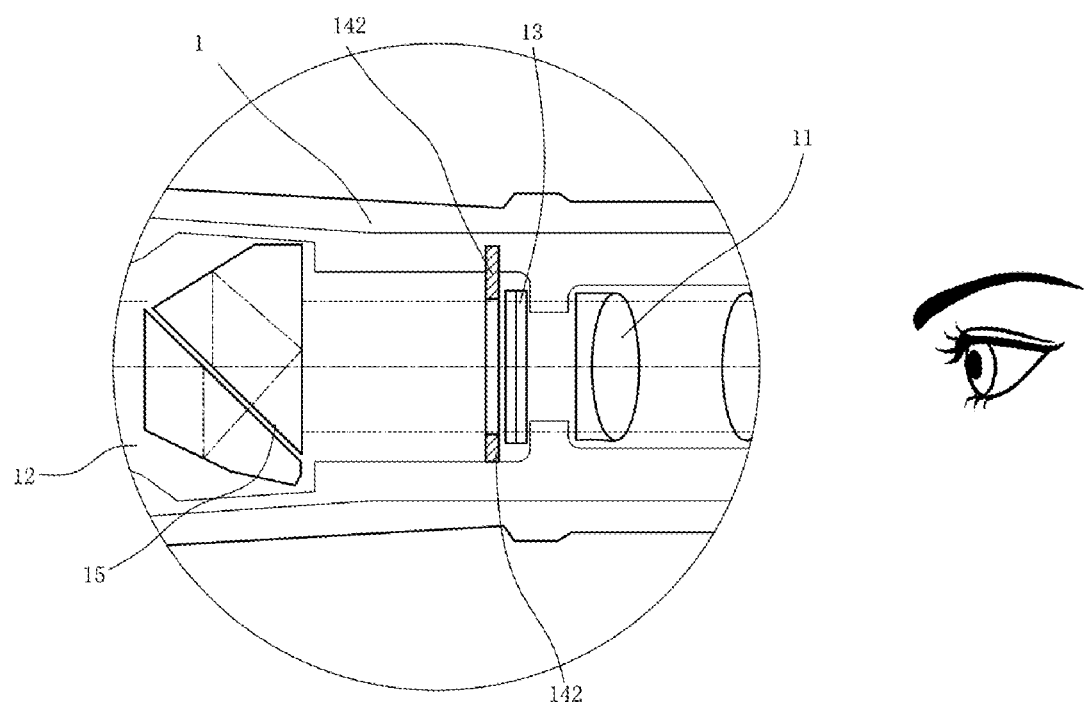
FIG. 9 is a planar structure diagram of a seventh embodiment of the present invention.

With reference to FIG. 9, FIG. 9 is a planar structure diagram of a seventh embodiment of the present invention.

Figure 10:
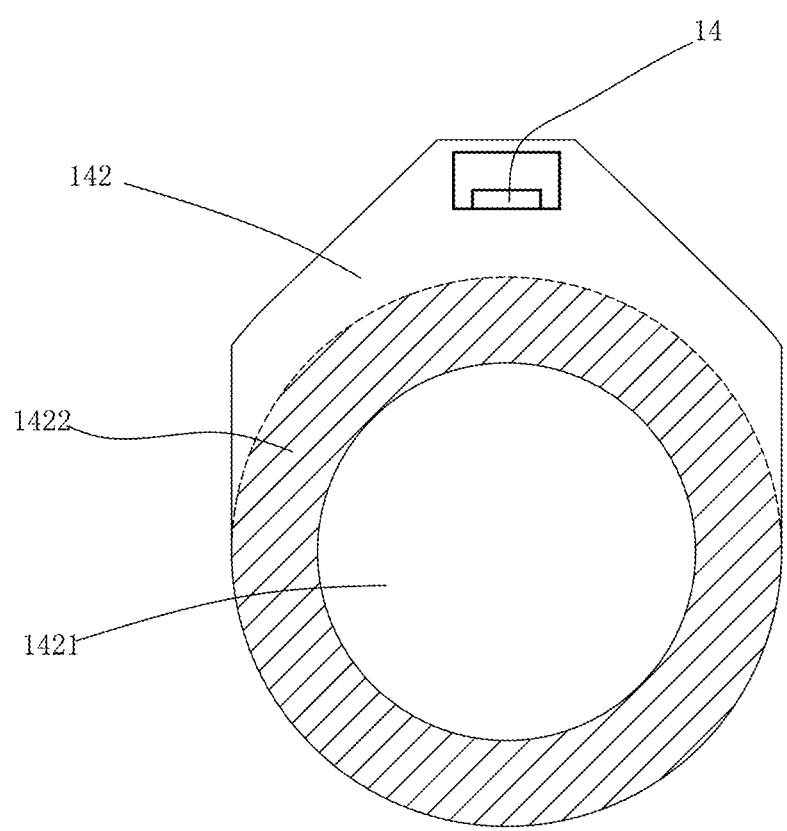
FIG. 10 is a structure diagram of the plane light source in FIG. 9.

In the embodiment as shown in FIG. 9, the light source 14 is a plane light source; the plane light source comprises a light diffusion plate 142 (see FIG. 10); the light diffusion plate 142 is provided with a through hole 1421; the through hole 1421 is larger than or equal to the area of the visible area 131; at least one point light source is disposed on a side surface of the light diffusion plate 142; a ring of effective light emitting area 1422 is disposed around the through hole 1421; light emitted by the effective light emitting area 1422 slantwise irradiates the visible area 131 of the light scattering LCD display screen; and the plane light source is disposed on an inner wall between the light scattering LCD display screen and the objective lens 12.

Figure 11:
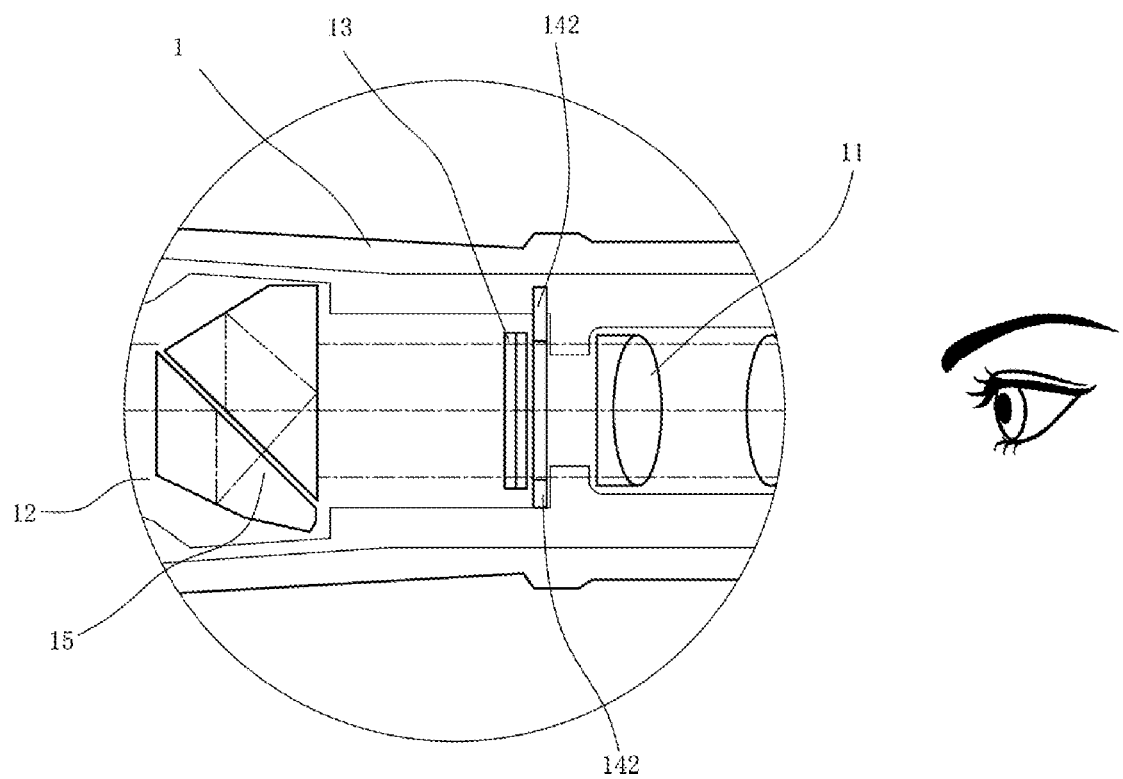
FIG. 11 is a planar structure diagram of an eighth embodiment of the present invention.

With reference to FIG. 11, FIG. 11 is a planar structure diagram of an eighth embodiment of the present invention.

In the embodiment as shown in FIG. 11, the light source 14 is a plane light source; the plane light source comprises a light diffusion plate 142 (see FIG. 10); the light diffusion plate 142 is provided with a through hole 1421; the through hole 1421 is larger than or equal to the area of the visible area 131; at least one point light source is disposed on a side surface of the light diffusion plate 142; a ring of effective light emitting area 1422 is disposed around the through hole 1421; light emitted by the effective light emitting area 1422 slantwise irradiates the visible area 131 of the light scattering LCD display screen; and the plane light source is disposed on an inner wall between the light scattering LCD display screen and the eye lens 11.

Figure 12:
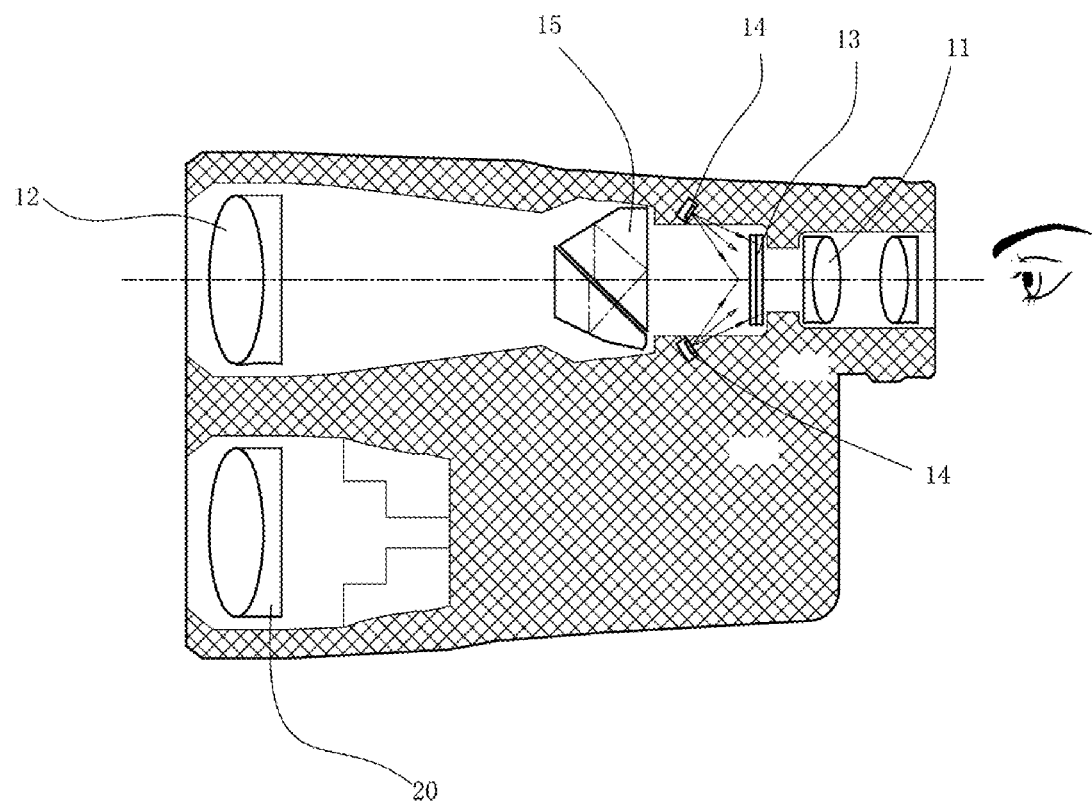
FIG. 12 is a sectional structure diagram of a first use state of an embodiment of the present invention.
Figure 13:
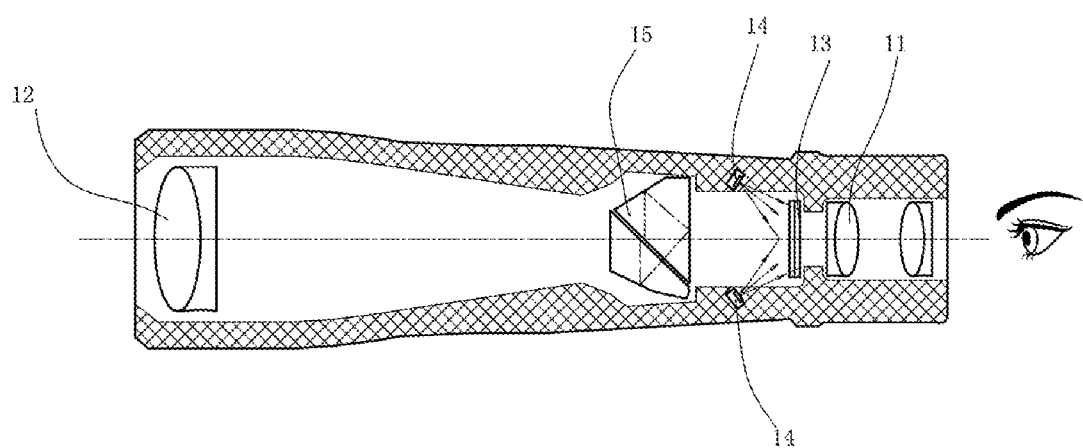
FIG. 13 is a sectional structure diagram of a second use state of an embodiment of the present invention.
Figure 14:
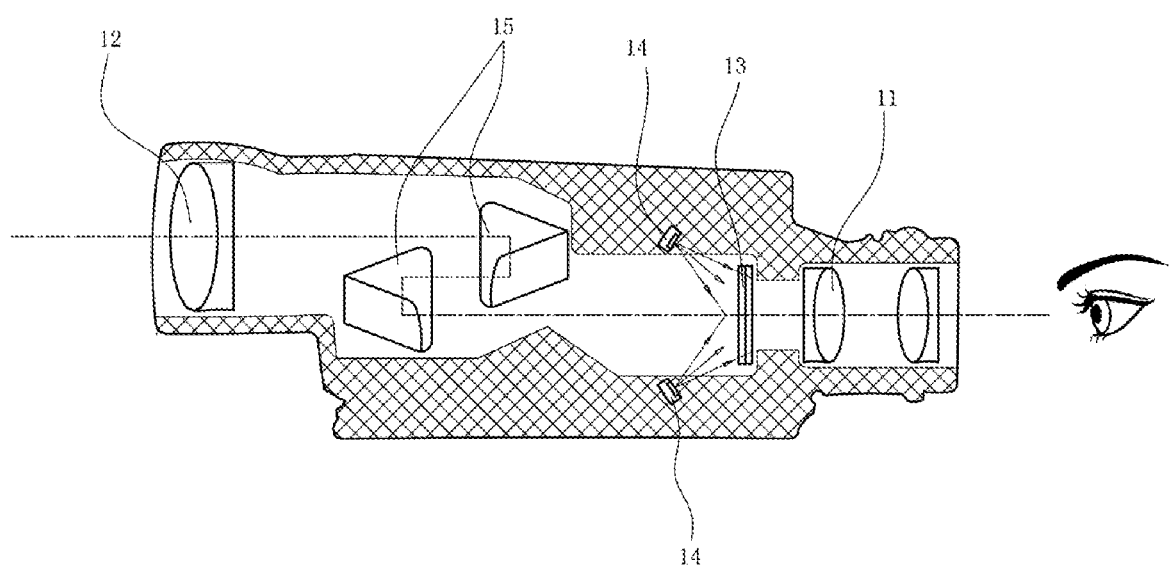
FIG. 14 is a sectional structure diagram of a third use state of an embodiment of the present invention.
Figure 15:
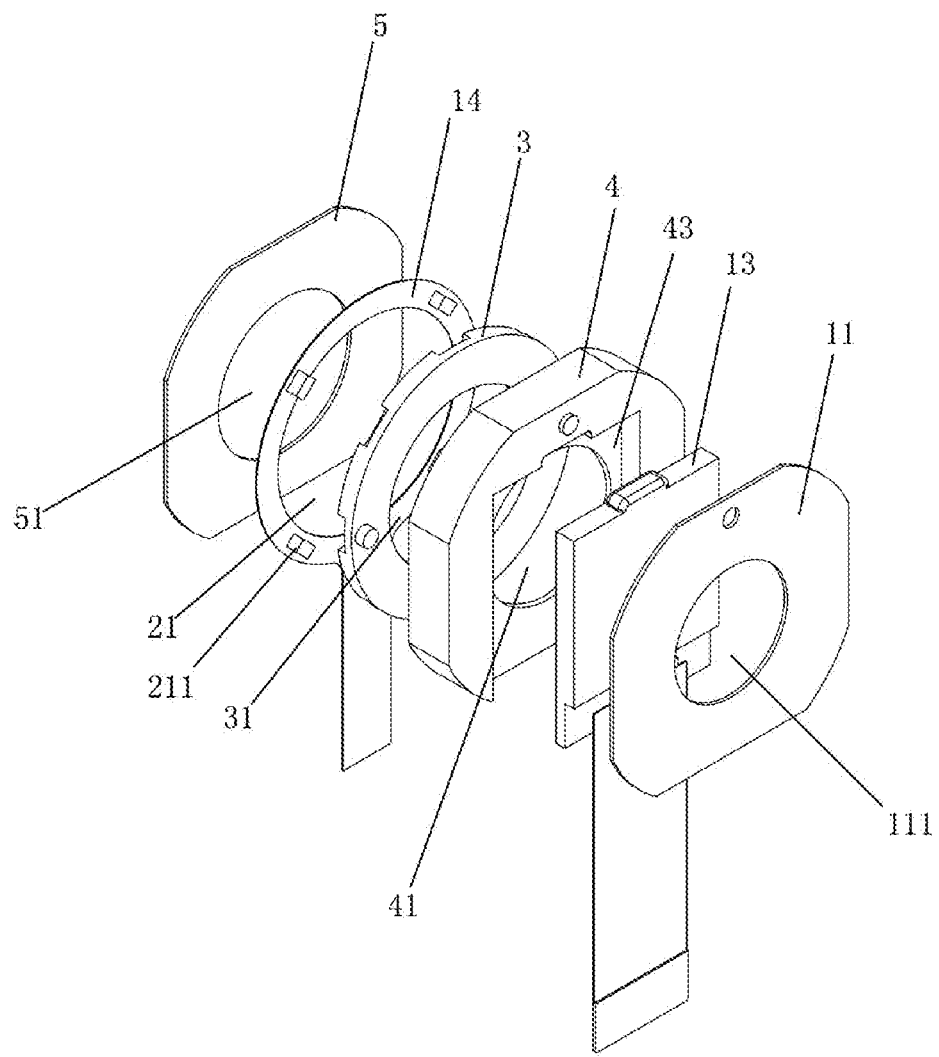
FIG. 15 is an exploded stereoscopic structure diagram of the liquid crystal display module in the present invention.
Figure 16:
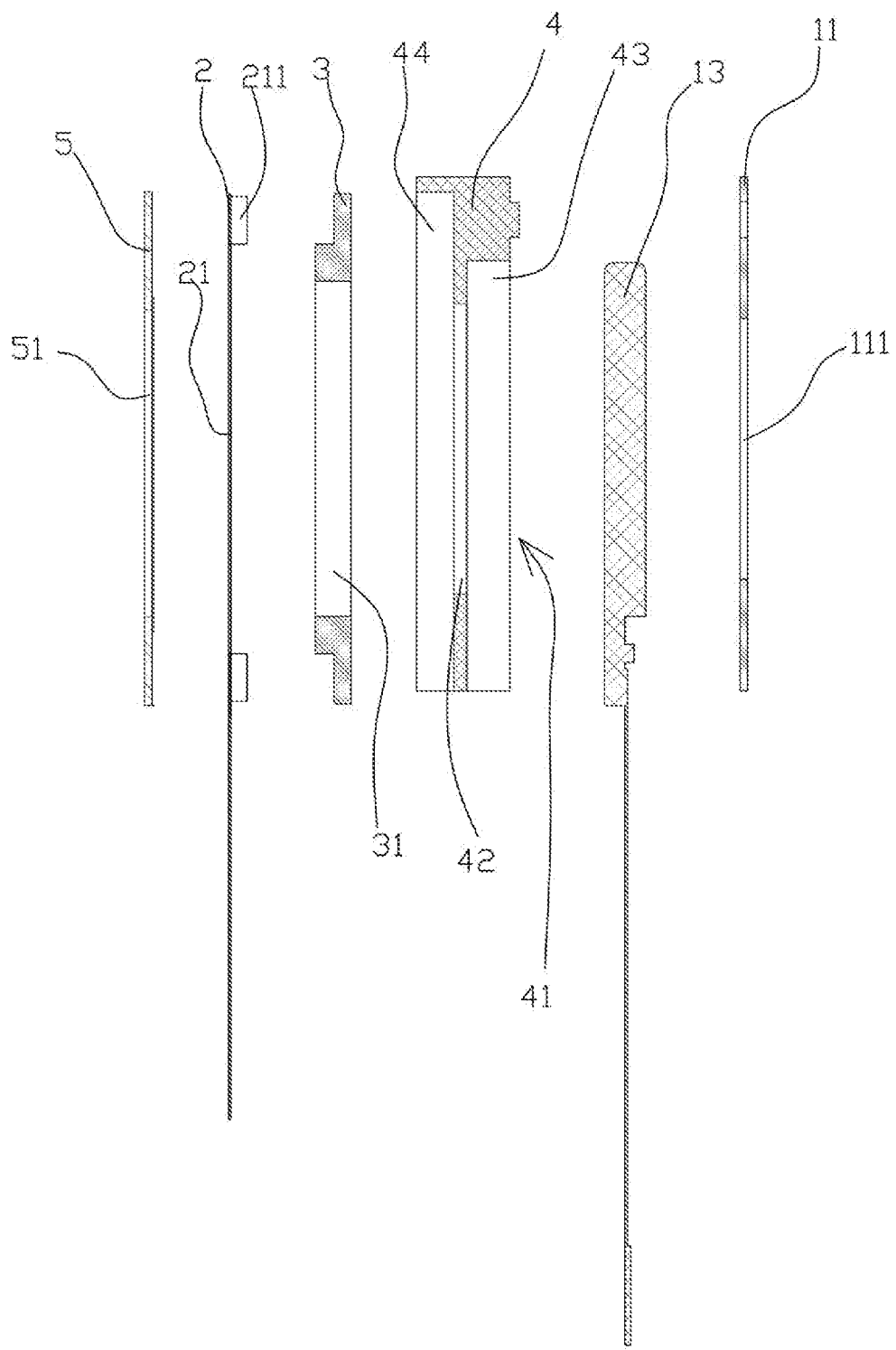
FIG. 16 is an exploded planar structure diagram of FIG. 15.
Figure 17:
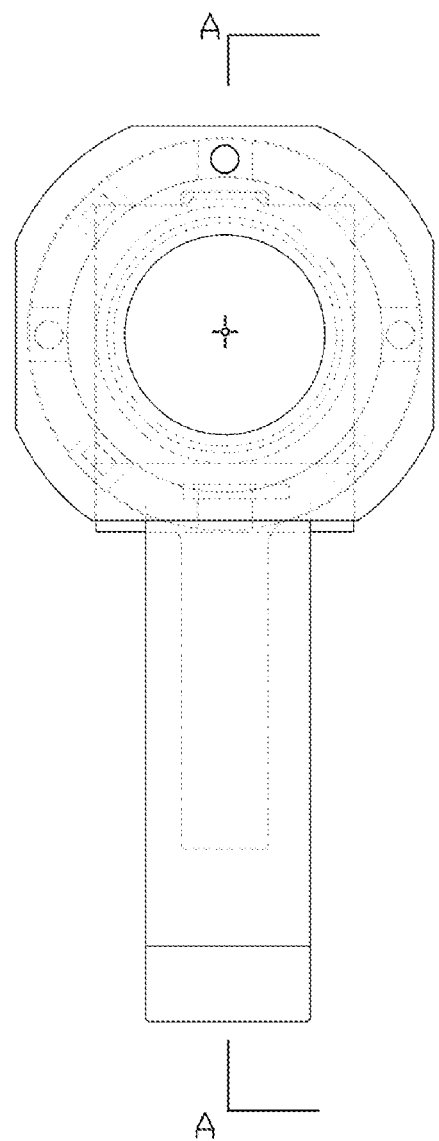
FIG. 17 is a planar structure diagram of FIG. 15 from another visual angle after being combined.
Figure 18:
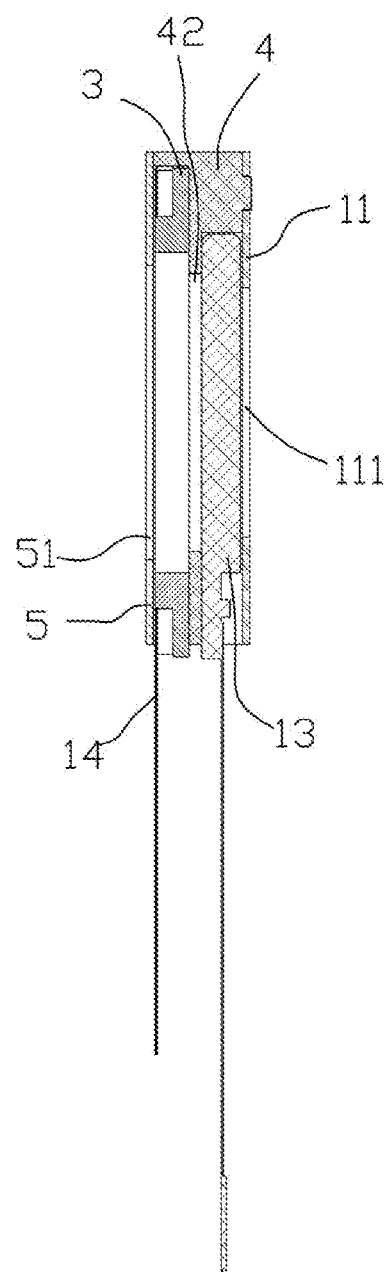
FIG. 18 is a sectional structure diagram of A-A in FIG. 17.

The present invention further provides uses of the optical lens barrel having a transmissive liquid crystal display function in the aspects of a range finder 20, a sighting piece, a magnifier, a telescope, a microscope and a camera viewfinder, wherein the optical lens barrel can display an actual distance between a viewed object and a user, and can also display the content such as the attribute of the viewed object and the like.

Wherein FIG. 12 is a sectional structure diagram of the optical lens barrel applied to a range finder in an embodiment of the present invention; FIG. 13 is a sectional structure diagram of the optical lens barrel applied to a sighting piece in an embodiment of the present invention; and FIG. 14 is a sectional structure diagram of the optical lens barrel applied to a telescope in an embodiment of the present invention.

Certainly, the present invention can also be applied to a microscope and a camera viewfinder, wherein the camera viewfinder comprises two types: a camera and a photographing device.

In the present invention, the light source 14 is a monochromatic light source in red, green or blue color, or is a mixed color light source consisting of any two or three of red, green and blue colors. Preferably, the light source 14 is an LED light source.

In the present invention, all the light sources not specifically noted are light sources, namely all the monochromatic light sources or the mixed color light sources consisting of any two or three of red, green and blue colors.

With reference to FIG. 15-18, FIG. 15-18 show a liquid crystal display module suitable for the present invention, comprising a light scattering LCD display screen 13, a light source 14, a light guide plate 3, and a fixing base 4 provided with a first through hole 41, wherein the light scattering LCD display screen 13 and a first light shielding member 11 are sequentially disposed on one side of the fixing base 4; the first light shielding member 11 is provided with a second through hole 111; the light guide plate 3 provided with a third through hole 31, the light source 14 provided with a fourth through hole 21, and a second light shielding member 5 provided with a fifth through hole 51 are sequentially disposed on the other side of the fixing base 4; the first through hole 41, the second through hole 111, the third through hole 31, the fourth through hole 21, and the fifth through hole 51 are at least partially overlapped, allowing light to pass through. In the present embodiment, a predetermined gap 42 can be disposed between the light guide plate 3 and the light scattering LCD display screen 13; the gap 42 can be used to adjust the incident angle of the light source 14, so as to reach an optimum display effect. Generally, the gap 42 can be selected from a range 0.5 mm-10 mm. In the embodiment, the first light shielding member 11 and the second light shielding member 5 can be a light shielding plate or a light shielding membrane. When a light shielding plate is used, the light shielding plate can be directly adhered on the fixing base 4; and when a light shielding membrane is used, the light shielding membrane can be adhered on the light source 14 and the light scattering LCD display screen 13. Certainly, when the first light shielding member 11 and the second light shielding member 5 are used in practical, the two light shielding members can also be formed directly on the inner wall of the optical lens barrel without being directly connected to the module. All in all, light shielding devices or structures disposed on the outer sides of the light source 14 and the light scattering LCD display screen 13 can be all considered to have the same effect as the first light shielding member 11 and the second light shielding member 5 in the present invention. In the present invention, the light source 14 is provided with a plurality of LED lamps 211.

Preferably, the light scattering LCD display screen 13 is an RPDLCD (reversed polymer dispersed liquid crystal display).

Preferably, the present invention further comprises a light sensor and a controller, wherein the light sensor senses the luminance of the external environment; and the controller adjusts the luminance of the light source 14 according to the luminance of the external environment. When the luminance of the external environment is strong, the luminance of the light source 14 can be appropriately reduced; on the contrary, the luminance of the light source 14 can be improved.

In the present invention, the first through hole 41, the second through hole 111, the third through hole 31, the fourth through hole 21, and the fifth through hole 51 had better be coaxially disposed; and the second through hole 111 and the fifth through hole 51 had better be circular holes.

Preferably, the fixing base 4 is provided with a first recession 43 on one side adjacent to the light scattering LCD display screen 13; the light scattering LCD display screen 13 is disposed in the first recession 43; when the light scattering LCD display screen 13 is disposed in the first recession 43, an outer surface of the light scattering LCD display screen 13 had better be flush with a corresponding outer surface of the fixing base 4.

Preferably, the fixing base 4 is provided with a second recession 44 on one side adjacent to the light guide plate 3; the light guide plate 3 is disposed in the second recession 44; when the light guide plate 3 is disposed in the second recession 44, an outer surface of the light guide plate 3 had better be flush with a corresponding outer surface of the fixing base 4.

Figure 19:
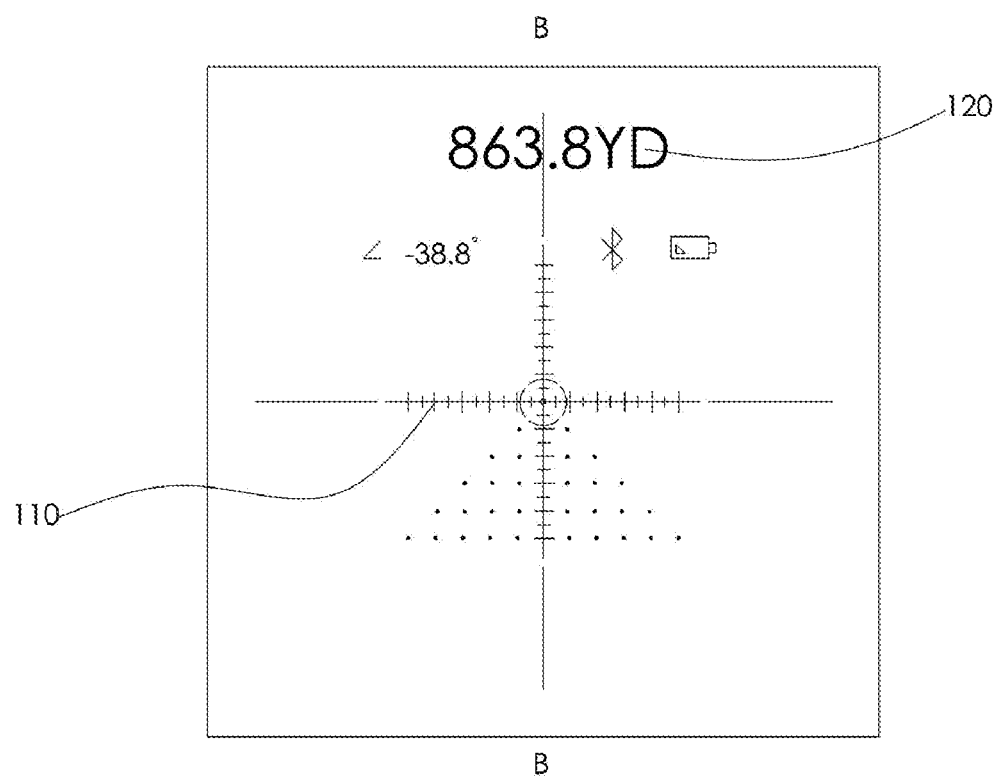
FIG. 19 is a planar structure diagram of the light scattering LCD display screen in the present invention.
Figure 20:
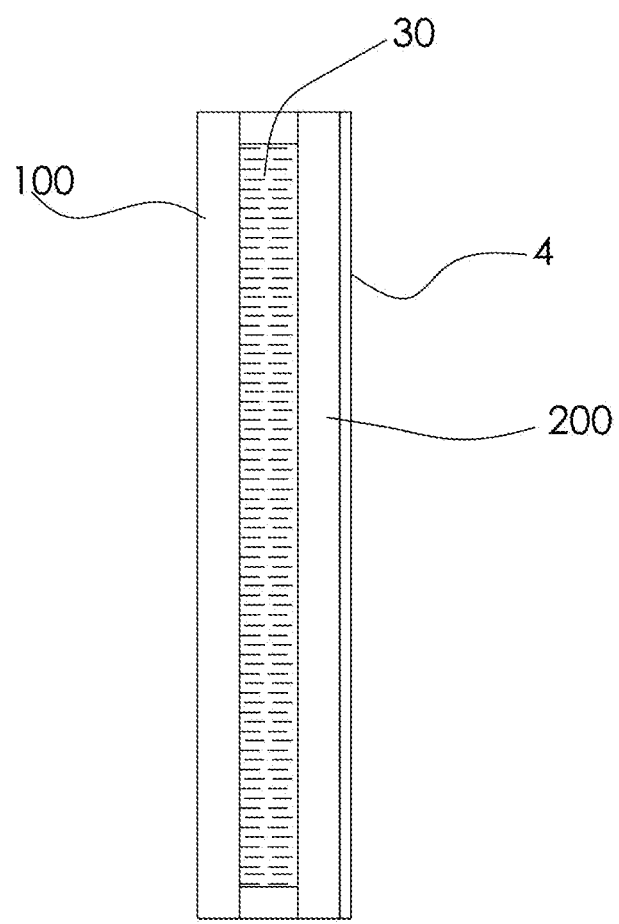
FIG. 20 is a sectional structure diagram of B-B in FIG. 19.

With reference to FIGS. 19 and 20, FIGS. 19 and 20 show a light scattering LCD display 13 with an optical reticle, comprising a first glass sheet 100 and a second glass sheet 200, wherein a liquid crystal display layer 30 is disposed between the first glass sheet 100 and the second glass sheet 200; the liquid crystal display layer 30 is used to display data information 120; the first glass sheet 100 or the second glass sheet 200 is provided with a cross scale 110 on one side adjacent to the liquid crystal display layer 30, or on one side away from the light scattering liquid crystal display layer 30; when light passes through the cross scale 110, the light passing through the cross scale 110 is basically absorbed, forming a color close to black.

It should be noted that when the cross scale 110 is disposed on one side of first glass sheet 100 or the second glass sheet 200 adjacent to the liquid crystal display layer 30, the cross scale should not generate interference with a transparent electrode disposed on one side of first glass sheet 100 or the second glass sheet 200 adjacent to the liquid crystal display layer 30.

Preferably, the cross scale 1 is made from a chromium membrane; and the light transmittance rate of the cross scale 110 is less than or equal to 20%. Still preferably, the light transmittance rate of the cross scale 110 is less than or equal to 10%.

Preferably, when the first glass sheet 100 or the second glass sheet 200 is provided with the cross scale 110 on one side away from the liquid crystal display layer 30, the cross scale 110 is pre-configured on a transparent sheet 4; and then the transparent sheet 4 is adhered, via a transparent adhesive, on one side of the first glass sheet 100 or the second glass sheet 200 away from the liquid crystal display layer 30. First, the cross scale 110 is configured on the transparent sheet 4; then, the transparent sheet 4 with the cross scale 110 is adhered on the outer side of the liquid crystal display, thus facilitating production and reducing cost.

It is apparent that the present invention can also be designed to, when the first glass sheet 100 or the second glass sheet 200 is provided with the cross scale 110 on one side away from the liquid crystal display layer 30, form the cross scale 110 directly on the surface of the first glass sheet 100 or the second glass sheet 200, that is, form the cross scale 110 directly on an outer surface of the first glass sheet 100 or the second glass sheet 200.

It is apparent that the present invention can also be designed to, when the first glass sheet 100 or the second glass sheet 200 is provided with the cross scale 110 on one side adjacent to the liquid crystal display layer 30, form the cross scale 110 directly on the surface of the first glass sheet 100 or the second glass sheet 200, that is, form the cross scale 110 directly on an inner surface of the first glass sheet 100 or the second glass sheet 200.

Preferably, in the embodiments above, the data information 120 includes but not limited to distance information, power consumption information, communication connection state information, ballistic trajectory, slope information, wind speed information or temperature information. Alternatively, the data information is a combination of any two or more of the above distance information, power consumption information, communication connection state information, ballistic trajectory, slope information, wind speed information and temperature information.

In the present invention, the liquid crystal display layer 30 can be replaced with an OLED material layer.

In the present invention, when not electrified, the light scattering LCD display screen is in a transparent state, and has a light transmittance between 80% and 98%; and when electrified, the light scattering LCD display screen is in a light scattering non-transparent state.

It should be noted that the detailed explanations for the embodiments above are only intended to explain the present invention, such that the present invention can be better understood. However, the descriptions cannot be considered to limit the present invention for any reasons. Particularly, the features in the descriptions of different embodiments can be mutually combined at will, so as to form other embodiments. Unless an explicit contrary description is provided, it should be understood that the features can be applied to any one embodiment, but are not limited to the described embodiments only.

What is claimed is:
1. An optical lens barrel having a transmissive liquid crystal display function, comprising a lens barrel body (1), an eye lens (11) disposed at one end of the lens barrel body (1), an objective lens (12) disposed at the other end of the lens barrel body (1), and an LCD display screen disposed at a focal plane position of the optical lens barrel, wherein a visible area (131) of the LCD display screen allows a user to directly view an object outside the lens barrel (1) from the eye lens (11) via the objective lens (12);

wherein the LCD display screen (13) displays a word and/or a pattern under the control of an LCD driver; the LCD display screen is a light scattering LCD display screen (13); the optical lens barrel is further internally provided with a light source (14); wherein the position of the light source (14) should satisfy the following conditions: the light source is disposed outside the visible area (131) of the light scattering LCD display screen, the light source is disposed in front and/or back of the light scattering LCD display screen, a maximum incident angle ($\alpha$) of light of the light source (14) is selected from a range greater than or equal to 30 degrees and less than 90 degrees, and incident light or reflected light of the light source (14) should avoid directly irradiating a visible area (111) of the eye lens.

2. The optical lens barrel having a transmissive liquid crystal display function according to claim 1, wherein the light source (14) is a monochromatic light source in red, green or blue color, or is a mixed color light source consisting of any two or three of red, green and blue colors.

3. The optical lens barrel having a transmissive liquid crystal display function according to claim 1, wherein the light source (14) is an LED light source.

4. The optical lens barrel having a transmissive liquid crystal display function according to claim 3, wherein the light source (14) is at least one point light source; each point light source is independently disposed on an inner wall between the light scattering LCD display screen and the eye lens (11); and light emitted by the point light sources slantwise irradiates the visible area (131) of the light scattering LCD display screen.

5. The optical lens barrel having a transmissive liquid crystal display function according to claim 3, wherein the light source (14) is a plurality of point light sources; the point light sources are disposed on an inner surface (1411) of an annular face plate (141); the annular face plate (141) is disposed on an inner wall between the light scattering LCD display screen and the eye lens (11); and light emitted by the point light sources slantwise irradiates the visible area (131) of the light scattering LCD display screen.

6. The optical lens barrel having a transmissive liquid crystal display function according to claim 1, wherein the light source (14) is at least one point light source; each point light source is independently disposed on an inner wall between the light scattering LCD display screen and the objective lens (12); and light emitted by the point light sources slantwise irradiates the visible area (131) of the light scattering LCD display screen.

7. The optical lens barrel having a transmissive liquid crystal display function according to claim 1, wherein the light source (14) is a plurality of point light sources; the point light sources are disposed on an inner surface (1411) of an annular face plate (141); the annular face plate (141) is disposed on an inner wall between the light scattering LCD display screen and the objective lens (12); and light emitted by the point light sources slantwise irradiates the visible area (131) of the light scattering LCD display screen.

8. The optical lens barrel having a transmissive liquid crystal display function according to claim 1, wherein the light source (14) is a plane light source; the plane light source comprises a light diffusion plate (142); the light diffusion plate (142) is provided with a through hole (1421) which is larger than or equal to the area of the visible area (131); at least one point light source is disposed on a side surface of the light diffusion plate (142); a ring of effective light emitting area (1422) is disposed around the through hole (1421); and light emitted by the effective light emitting area (1422) slantwise irradiates the visible area (131) of the light scattering LCD display screen.

9. The optical lens barrel having a transmissive liquid crystal display function according to claim 8, wherein the plane light source is disposed on an inner wall between the light scattering LCD display screen and the objective lens (12), or is disposed on inner wall between the light scattering LCD display screen and the eye lens (11), or is directly attached on an outer surface of the light scattering LCD display screen.

10. The optical lens barrel having a transmissive liquid crystal display function according to claim 1, wherein the light scattering LCD display screen is an RPDLCD.

11. The optical lens barrel having a transmissive liquid crystal display function according to claim 1, wherein the maximum incident angle ($\alpha$) of light of the light source (14) is selected from a range greater than or equal to 45 degrees and less than 90 degrees.

12. A liquid crystal display module for an optical lens barrel, comprising a light scattering LCD display screen (13), a light source (14), a light guide plate (3), and a fixing base (4) provided with a first through hole (41), wherein the light scattering LCD display screen (13) and a first light shielding member (11) are sequentially disposed on one side of the fixing base (4); the first light shielding member (11) is provided with a second through hole (111); the light guide plate (3) provided with a third through hole (31), the light source (14) provided with a fourth through hole (21), and a second light shielding member (5) provided with a fifth through hole (51) are sequentially disposed on the other side of the fixing base (4); the first through hole (41), the second through hole (111), the third through hole (31), the fourth through hole (21), and the fifth through hole (51) are at least partially overlapped, allowing light to pass through.

13. The liquid crystal display module for an optical lens barrel according to claim 12, wherein the first light shielding (11) is a light shielding plate or a light shielding membrane.

14. The liquid crystal display module for an optical lens barrel according to claim 13, wherein the fixing base (4) is provided with a first recession (43) on one side adjacent to the light scattering LCD display screen (13); and the light scattering LCD display screen (13) is disposed in the first recession (43).

15. The liquid crystal display module for an optical lens barrel according to claim 12, wherein the first through hole (41), the second through hole (111), the third through hole (31), the fourth through hole (21), and the fifth through hole (51) are coaxially disposed.

16. The liquid crystal display module for an optical lens barrel according to claim 12, wherein the fixing base (4) is provided with a second recession (44) on one side adjacent to the light guide plate (3); and the light guide plate (3) is disposed in the second recession (44).

17. A light scattering LCD display screen (13) with an optical reticle, comprising a first glass sheet (100) and a second glass sheet (200), wherein a light scattering liquid crystal display layer (30) is disposed between the first glass sheet (100) and the second glass sheet (200); the light scattering liquid crystal display layer (30) is used to display data information; the first glass sheet (100) or the second glass sheet (200) is provided with a cross scale (110) on one side adjacent to the light scattering liquid crystal display layer (30), or on one side away from the light scattering liquid crystal display layer (30); when light passes through the cross scale (110), the light passing through the cross scale (110) is basically absorbed, forming a grey color.

18. The light scattering LCD display screen (13) with an optical reticle according to claim 17, wherein the light transmittance rate of the cross scale (110) is less than or equal to 20%.

19. The light scattering LCD display screen (13) with an optical reticle according to claim 17, wherein when the first glass sheet (100) or the second glass sheet (200) is provided with the cross scale (110) on one side away from the light scattering liquid crystal display layer (30), the cross scale (110) is pre-configured on a transparent sheet (4); and then the transparent sheet (4) is adhered, via a transparent adhesive, on one side of the first glass sheet (100) or the second glass sheet (200) away from the light scattering liquid crystal display layer (30).

20. The light scattering LCD display screen (13) with an optical reticle according to claim 17, wherein when the first glass sheet (100) or the second glass sheet (200) is provided with the cross scale (110) on one side away from the light scattering liquid crystal display layer (30), the cross scale (110) is directly formed on a surface of the first glass sheet (100) or the second glass sheet (200).

* * * * *